(12) United States Patent
Sokołowski et al.

(10) Patent No.: US 12,454,228 B2
(45) Date of Patent: Oct. 28, 2025

(54) HEAT SHIELD ASSEMBLY FOR WHEEL

(71) Applicant: Goodrich Corporation, Charlotte, NC (US)

(72) Inventors: Marcin Szymon Sokołowski, Wojsławice-Kolonia (PL); Bartłomiej Kamil Żuk, Legnica (PL); Mirosław Stanisław Sosnowski, Mirków (PL); Aleksander Andrzej Błachut, Ozimek (PL); Maciej Wojciech Krulak, Warsaw (PL)

(73) Assignee: GOODRICH CORPORATION, Charlotte, NC (US)

( * ) Notice: Subject to any disclaimer, the term of this patent is extended or adjusted under 35 U.S.C. 154(b) by 561 days.

(21) Appl. No.: 17/901,734

(22) Filed: Sep. 1, 2022

(65) Prior Publication Data

US 2023/0096369 A1    Mar. 30, 2023

(30) Foreign Application Priority Data

Sep. 24, 2021 (EP) .................................... 21461603

(51) Int. Cl.
*B60R 13/08* (2006.01)
*B60B 21/12* (2006.01)

(52) U.S. Cl.
CPC .............. *B60R 13/08* (2013.01); *B60B 21/12* (2013.01)

(58) Field of Classification Search
CPC ..... B60R 13/08; B60R 13/0876; B60B 21/12; F16D 65/78

USPC .......................................... 301/6.2, 6.3, 6.91
See application file for complete search history.

(56) References Cited

U.S. PATENT DOCUMENTS

| | | | |
|---|---|---|---|
| 3,138,406 A | 6/1964 | Chamberlain | |
| 4,084,857 A | 4/1978 | Vanderveen | |
| 5,002,342 A | 3/1991 | Dyko | |
| 5,199,536 A | 4/1993 | Clark | |
| 5,248,013 A | 9/1993 | Hogue et al. | |
| 7,051,845 B2 | 5/2006 | Thorp et al. | |
| 9,718,317 B2 | 8/2017 | Kendricks | |
| 2013/0015697 A1 | 1/2013 | Hall et al. | |
| 2020/0141461 A1 | 5/2020 | Brodard et al. | |

OTHER PUBLICATIONS

EPO, European Extended Search Report dated Mar. 11, 2022 with EP Serial No. 21461603.9.

*Primary Examiner* — S. Joseph Morano
*Assistant Examiner* — Alex Palmer
(74) *Attorney, Agent, or Firm* — SNELL & WILMER L.L.P.

(57) ABSTRACT

A heat shield assembly for a vehicle wheel is provided. The heat shield assembly includes either a single tubular heat shield panel or a plurality of heat sectional panel sections arranged to be connected to one another to form a tubular heat shield panel. Each of the plurality of heat sectional panel sections have an inner diameter surface and an outer diameter surface, the outer diameter surface arranged to be positioned, in use, adjacent to and spaced apart from an inner diameter surface of a wheel. Each panel section is provided with one or more grooves extending in the circumferential direction. One or more wires are provided in one or more of the grooves.

9 Claims, 2 Drawing Sheets

Stiffness reinforcement using wire

Stiffness reinforcement using wire

HEAT SHIELD ASSEMBLY FOR WHEEL

CROSS-REFERENCE TO RELATED APPLICATIONS

This application claims priority to, and the benefit of, EP Patent Application No. 21461603.9, filed Sep. 24, 2021 (DAS Code 10E1) and titled "HEAT SHIELD ASSEMBLY FOR WHEEL," which is incorporated by reference herein in its entirety for all purposes.

FIELD

The present disclosure relates to a heat shield assembly for a wheel for a vehicle especially, but not exclusively, for an aircraft wheel.

BACKGROUND

Wheels on aircraft and other vehicles are often provided with a brake assembly comprising a stack of brake discs mounted inside the wheel, within the tube well of the wheel. The brake operates by compressing the brake discs together to slow and stop rotation of the wheel. The friction between the pressed brake discs generates a large amount of heat which can cause damage to the wheel and/or tires. It is conventional to provide a heat shield between the brake assembly and the wheel rim or tube well to reduce the effects of the heat generated by braking on the wheel parts. The heat shield can also catch hot brake material that is ejected from the brake discs during braking, before it strikes the wheel.

Various types of heat shield are known but, typically, heat shields are in the form of metal sheets or panels provided concentric with the wheel tube well and spaced a small distance from the tube well. The heat shield can be provided as a single cylindrical piece or as a number of arcuate panels or sections that are attached together to form a complete cylindrical heat shield.

Particularly with the increased use of carbon disc brakes, which have greater energy absorption capability than steel brakes and are significantly lighter, but which are larger than steel brake discs, the need for robust and effective heat shields has become more important. Although it is important for the heat shields to be robust, there is also a need for them to be as simple and lightweight as possible. In aircraft in particular, but also in other vehicles with braked wheels, there is a need to minimize the weight and size of the wheel assembly. Heat shields are therefore, often made of thin metal panels but may be arranged as two or more layers of panels with an insulation gap therebetween. Because the individual panels are made of a thin material, they are often shaped with ridges or channels to improve the rigidity of the panel. Such ridges are often in the form of stamped beads defining valleys therebetween to add to the stiffness of the panel.

Because of the high temperature and high stress/vibrational environments that braked wheels operate in and high centrifugal forces acting on the heat shields, as well as changes in tire pressure, the heat shield can be caused to deform and/or deflect. This can cause high stresses on the heat shield and can cause the heat shield to come into contact with the wheel tube well which can, in turn, result in wheel abrasion. This is even more of an issue for carbon brakes because they are larger so there is less space between the discs and the wheel.

There is a need for a heat shield assembly which is less prone to deflection and deforming so as to avoid or reduce damage to the heat shield and to avoid or reduce wheel abrasion.

SUMMARY

According to the present disclosure, there is provided a heat shield assembly for a vehicle wheel, comprising a single tubular heat shield panel or a plurality of heat sectional panel sections arranged to be connected to one another to form a tubular heat shield panel, the panel have an inner diameter surface and an outer diameter surface, the outer diameter surface arranged to be positioned, in use, adjacent to and spaced apart from an inner diameter surface of a wheel, and wherein the panel or each panel section is provided with one or more ridges extending in the circumferential direction, and wherein one or more wires is provided in one or more of the ridges.

The wires are provided to reinforce or increase the stiffness of the panel/panel sections, making use of existing grooves, where provided. The wires, being of small diameter, can add to the stiffness of the panel without substantially adding to the size and weight of the panel. The use of thin, straight wires provided in an essentially linear arrangement provides a stiff frame structure for the panel/s.

BRIEF DESCRIPTION OF THE DRAWINGS

The assembly according to the disclosure will be described, by way of example only, with reference to the drawings. Variations and modifications are possible within the scope of the claims.

DETAILED DESCRIPTION

Figure 1:
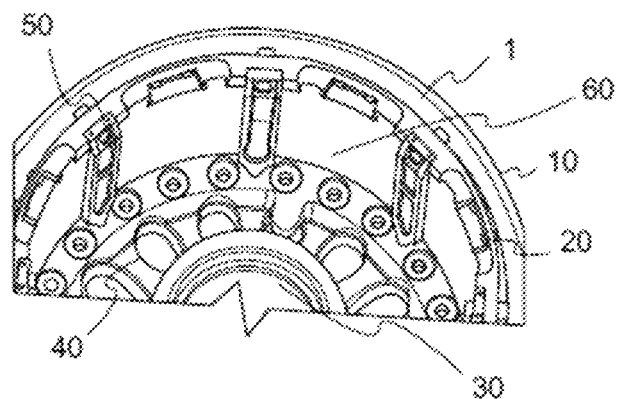
FIG. 1 shows an example of a heat shield in a wheel.

FIG. 1 shows a section of a typical wheel assembly comprising a wheel rim or tube well 1 having an outer diameter surface 10, on which a tire (not shown) will usually be mounted, and an inner diameter surface 20 defining an interior cavity in which a brake assembly (not shown) will typically be arranged around a wheel hub 30. The hub 30 would be attached by bearing to an axle (not shown). The hub 30 is connected to the wheel rim 1 via a web 40. Rotor disc drive lugs 50 extend axially across the tube well 1 for engagement with the brake discs.

Figure 3:
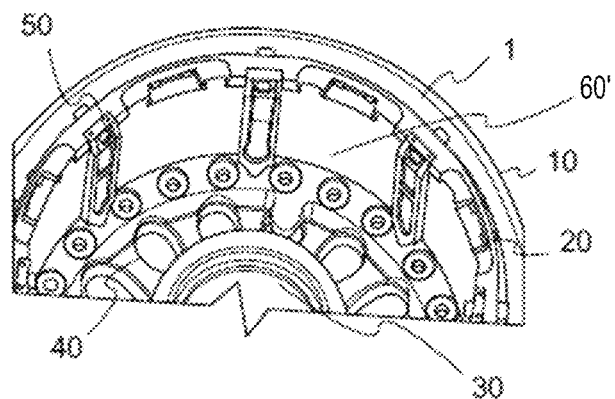
FIG. 3 shows an alternative example of a single tubular heat shield in a wheel.

To protect the wheel rim 1 from the heat generated during hard braking or from brake disc material ejected during braking, a heat shield is mounted to the inner diameter surface 20 of the wheel. The heat shield may be a single tubular shield (See FIG. 3) or, as shown in the example in FIG. 1, may be formed of several heat shield panels 60 provided between the rotor drive lugs 50. The heat shield/panels 60 is in the form of an arcuate thin metal sheet or several thin metal sheets and is attached to the wheel so as to be spaced apart from the wheel inner diameter surface by a small insulation gap (not shown).

As mentioned above, in the harsh braking conditions experienced by e.g. wheels on an aircraft landing gear, high temperatures are reached and pieces of hot material can break off from the rotor discs. All of this can cause the heat shield panels to deform or deflect and be damaged and/or to contact the wall by being deflected into the insulation gap. This can cause wheel abrasion and require the entire wheel assembly to be replaced.

Figure 2:
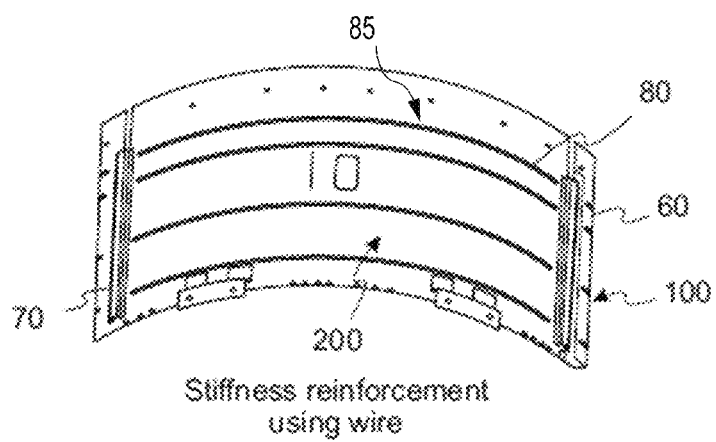
FIG. 2 shows a heat shield panel modified according to the disclosure.

FIG. 2 shows a heat shield panel 60 modified according to the disclosure to add stiffness and strength to the panel to reduce deformation or deflection of the panel so as to avoid or mitigate the problems mentioned above.

Figure 4:
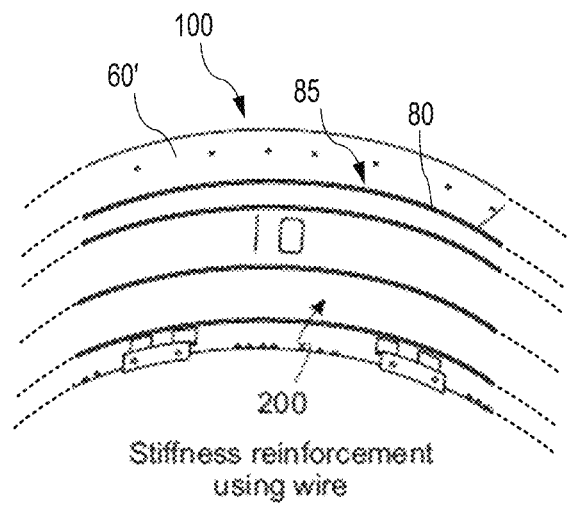
FIG. 4 shows a partial section of a single tubular heat shield modified according to the disclosure.

The panel 60 has an arcuate shape corresponding to the curve of the inner diameter surface 20 of the wheel. FIG. 2 also shows attachment points 70 where the panel 60 is attached to adjacent panels to extend around the entire inner surface of the wheel. FIG. 4 shows a section of a single tubular heat shield 60'. The panels or the single tubular heat shield have an outer diameter surface 100 that, in use, faces the inner diameter surface 20 of the wheel rim 1, and an opposite inner diameter surface 200 that faces radially inwards towards the hub 30. The panels 60 or the single tubular heat shield 60' are provided with machined grooves or channels 85 on the inner diameter surface 200, extending in the circumferential direction (defined relative to the wheel). To add strength and stiffness to the panels or the single tubular heat shield in accordance with the disclosure, wires 80 are fitted into one or more of these grooves or channels 85. In the example shown, the panel or the single tubular heat shield has four grooves or channels 85, each having a stiffening wire mounted therein. Of course, different numbers of grooves or channels 85 and/or wires may be provided depending on the wheel assembly design and use and the required reinforcement. The spacing between the grooves or channels 85 and wires can also be varied, as can the diameters of the wires.

The wires 80 can be secured in the grooves or channels 85 by e.g. welding. Seam welding is one particularly advantageous possibility.

The wires can be made of various materials. For example, they may be made of the same material as the heat shield panels or of a stiffer material.

The modification provides a stiffer more robust heat shield which is simple to manufacture and is lightweight.

What is claimed is:

1. A heat shield assembly for a vehicle wheel, comprising a single tubular heat shield or a plurality of heat shield panel sections arranged to be connected to one another to form a tubular heat shield, the single tubular heat shield or the tubular heat shield having an inner diameter surface and an outer diameter surface, the outer diameter surface arranged to be positioned, in use, adjacent to and spaced apart from an inner diameter surface of a wheel rim, and wherein the single tubular heat shield or each heat shield panel section of the plurality of heat shield panel sections is provided with one or more grooves extending in a circumferential direction, and wherein one or more wires is provided in each of the one or more grooves.

2. The heat shield assembly of claim 1, further comprising connector means for attaching each heat shield panel section of the plurality of heat shield panel sections to an adjacent heat shield panel section of the plurality of heat shield panel sections.

3. The heat shield assembly of claim 1, wherein the one or more wires are secured in the one or more grooves by welding.

4. The heat shield assembly of claim 3, wherein the one or more wires are secured in the one or more grooves by seam welding.

5. The heat shield assembly of claim 1, wherein the one or more wires are made of the same material as the single tubular heat shield or the tubular heat shield.

6. A wheel assembly comprising the wheel rim having the inner diameter surface and an outer diameter surface and the heat shield assembly as claimed in claim 1 mounted radially inward of and spaced from the inner diameter surface.

7. The wheel assembly of claim 6, wherein the plurality of heat shield panel sections are connected to form the tubular heat shield that is concentric with the wheel rim.

8. The wheel assembly of claim 6, wherein the one or more wires are mounted to the tubular heat shield on the inner diameter surface of the tubular heat shield opposite the outer diameter surface of the tubular heat shield, wherein the outer diameter surface of the tubular heat shield is adjacent the inner diameter surface of the wheel rim.

9. The wheel assembly of claim 6, further comprising a wheel hub located concentric with a radially inward surface of the wheel rim and the tubular heat shield.

\* \* \* \* \*